(12) United States Patent
Hammarlund et al.

(10) Patent No.: US 7,085,889 B2
(45) Date of Patent: Aug. 1, 2006

(54) USE OF A CONTEXT IDENTIFIER IN A CACHE MEMORY

(75) Inventors: Per Hammarlund, Hillsboro, OR (US); Aravindh Baktha, Portland, OR (US); Michael D Upton, Portland, OR (US); Venkat K. S. Venkatraman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 10/104,815

(22) Filed: Mar. 22, 2002

(65) Prior Publication Data

US 2003/0182512 A1 Sep. 25, 2003

(51) Int. Cl.
*G06F 12/00* (2006.01)

(52) U.S. Cl. .................................... 711/130; 711/206

(58) Field of Classification Search ................ 711/118, 711/129, 130, 205, 206, 207, 208, 173, 133; 709/108
See application file for complete search history.

(56) References Cited

U.S. PATENT DOCUMENTS

| | | | |
|---|---|---|---|
| 5,341,487 A | 8/1994 | Derwin et al. | |
| 5,548,733 A | 8/1996 | Sarangdhar et al. | |
| 5,568,620 A | 10/1996 | Sarangdhar et al. | |
| 5,572,703 A | 11/1996 | MacWilliams et al. | |
| 5,581,782 A | 12/1996 | Sarangdhar et al. | |
| 5,615,343 A | 3/1997 | Sarangdhar et al. | |
| 5,710,906 A | 1/1998 | Ghosh et al. | |
| 5,754,818 A * | 5/1998 | Mohamed | 711/207 |
| 5,774,700 A | 6/1998 | Fisch et al. | |
| 5,787,490 A * | 7/1998 | Ozawa | 711/173 |
| 5,796,977 A | 8/1998 | Sarangdhar et al. | |
| 5,809,522 A * | 9/1998 | Novak et al. | 711/118 |
| 5,812,803 A | 9/1998 | Pawlowski et al. | |
| 5,838,995 A | 11/1998 | Chen et al. | |
| 5,844,858 A | 12/1998 | Kyung | |
| 5,903,738 A | 5/1999 | Sarangdhar et al. | |
| 5,919,254 A | 7/1999 | Pawlowski et al. | |
| 5,937,171 A | 8/1999 | Sarangdhar et al. | |
| 5,964,856 A | 10/1999 | Wu et al. | |
| 5,978,869 A | 11/1999 | Guthrie et al. | |
| 5,991,855 A | 11/1999 | Jeddeloh et al. | |
| 5,998,023 A | 12/1999 | Turkevich et al. | |

(Continued)

FOREIGN PATENT DOCUMENTS

| | | |
|---|---|---|
| EP | 0 706 137 A1 | 4/1996 |
| EP | 1 182 571 A2 | 2/2002 |
| EP | 1215582 A1 | 6/2002 |
| WO | WO 95/24678 | 9/1995 |
| WO | WO 99/36858 | 7/1999 |

OTHER PUBLICATIONS

Jim Handy, "The Cache Memory Book—The Authoritative Reference on Cache Design", Second Edition, Academic Press, 1998.

Picker, Dan, et al. Enhancing SCI's Fairnss Protocol for Increased Throughput, Oct. 19–22, 1993, IEEE 1993 International Conference on Network Protocols, pp. 292–299.

(Continued)

*Primary Examiner*—Kevin Verbrugge
(74) *Attorney, Agent, or Firm*—Blakely, Sokoloff, Taylor & Zafman LLP

(57) ABSTRACT

A context identifier is used in a cache memory apparatus. The context identifier may be written into the tag of a cache line or may be written as an addition to the tag of a cache line, during cache write operation. During a cache read operation, the context identifier of as issued instruction may be compared with the context identifier in the cache line's tag. The cache line's data block may be transferred if the context identifiers and the tags match.

10 Claims, 8 Drawing Sheets

U.S. PATENT DOCUMENTS

| | | | |
|---|---|---|---|
| 6,012,118 | A | 1/2000 | Jayakumar et al. |
| 6,041,380 | A | 3/2000 | LaBerge |
| 6,065,101 | A | 5/2000 | Gilda |
| 6,081,877 | A | 6/2000 | Taki |
| 6,092,156 | A | 7/2000 | Schibinger et al. |
| 6,108,736 | A | 8/2000 | Bell |
| 6,141,747 | A | 10/2000 | Witt |
| 6,272,604 | B1 | 8/2001 | Nunez et al. |
| 6,405,271 | B1 | 6/2002 | MacWilliams et al. |
| 6,427,162 | B1 * | 7/2002 | Mohamed .................... 709/108 |
| 6,449,677 | B1 | 9/2002 | Olarig et al. |
| 6,487,621 | B1 | 11/2002 | MacLaren |
| 6,560,690 | B1 * | 5/2003 | Hum et al. ................. 711/210 |
| 6,591,321 | B1 | 7/2003 | Arimilli et al. |
| 6,601,121 | B1 | 7/2003 | Singh et al. |
| 6,609,171 | B1 | 8/2003 | Singh et al. |
| 6,615,323 | B1 | 9/2003 | Petersen et al. |
| 6,675,282 | B1 * | 1/2004 | Hum et al. ................. 711/213 |
| 6,691,118 | B1 * | 2/2004 | Gongwer et al. ........... 707/100 |
| 2001/0007999 | A1 | 7/2001 | Rasmussen et al. |
| 2001/0037424 | A1 | 11/2001 | Singh et al. |
| 2002/0059501 | A1 | 5/2002 | McKinney et al. |
| 2002/0062459 | A1 * | 5/2002 | Lasserre et al. .............. 714/10 |
| 2002/0087795 | A1 * | 7/2002 | Hum et al. .................. 711/130 |
| 2002/0087824 | A1 * | 7/2002 | Hum et al. .................. 711/202 |
| 2002/0147875 | A1 | 10/2002 | Singh et al. |

OTHER PUBLICATIONS

Shanley, Tom, Pentium®Pro and Pentium®II System Architecture, Second Edition, Copyright 1998 by Mindshare, Inc., Addison–Wesley, Boston, San Francisco, New York, Toronto, Montreal, London, Munich, Paris, Madrid, Capetown, Sydney, Tokyo, Singapore, Mexico City, pp. 199–375.

Accelerated Graphics Port Interface Specification Revision 1.0, Jul. 31, 1996, Intel Corporation, 151 pages.

IEEE Standard for a High–Performance Synchronous 32–Bit Bus: MULTIBUS'II, 1988, published by The Institute of Electrical and Electronics Engineers, Inc., New York, NY.

Multibus®II Bus Architecture Specificatioin Handbook, 1984, Intel Corporation, Santa Clara, CA.

Protocol Extensions to Microprocessor Memory Bus to Support Extended Address Space, May 1, 1994, IBM, vol. 37, Issue 5, pp. 389–390.

* cited by examiner

USE OF A CONTEXT IDENTIFIER IN A CACHE MEMORY

FIELD OF THE INVENTION

This invention relates to computer technology. More particularly, this invention relates to improving the performance of cache memory in a computing device.

BACKGROUND OF THE INVENTION

The use of one or more cache memory systems within a computer's memory hierarchy is a well-known technique to increase the performance of a computer (see e.g., Handy, Jim; *The Cache Memory Book*; Academic Press, 1998). FIG. 1 illustrates a typical cache memory array 100. Cache memory array 100 includes cache lines 110. Each cache line includes a tag 120 and a data block 130. Example cache line 140 includes tag 150 and data block 160. Reference numeral 170 illustrates that example tag 150 is a portion of main memory address 170. Main memory address 170 is the main memory address corresponding to data block 160.

Processors transfer instructions and operands back and forth between the execution core of the processor and the computer's memory hierarchy during memory transfers. Examples of memory transfers are loading instructions/operands from the memory hierarchy to the processor and storing instructions/operands from the processor to the memory hierarchy. During a memory transfer, the processor generates a main memory address. A portion of the main memory address is compared with the entries in tag 120 during a cache look-up to determine whether cache array 100 contains an entry corresponding to the memory transfer. As demonstrated by the relationship between tag 150 and main memory address 170, the process of a cache look-up is accelerated by requiring the processor to compare only a portion of each main memory address with each entry in the tag. Typically, cache memory uses a portion of each linear address generated by the processor to index data stored in cache array 100.

A thread is a part of a computer program that can execute independently of other parts of the computer program. The performance of a processor can be enhanced if multiple threads are executed concurrently on the processor. Concurrent execution of multiple threads is possible if the dependencies among the various instructions of the multiple threads are detected and properly managed.

FIG. 2 illustrates how many Intel® processors use a virtual memory environment to allow a large linear address space to be supported by a small amount of physical memory (e.g., random access memory). During a memory transfer, a processor generates a linear address 210. Linear address 210 comprises a directory field 220, a table field 225, and an offset field 230. The base of the page directory 235 is contained in control register CR3 240. The directory entry 220 of linear address 210 provides an offset to the value contained in control register CR3 240. The page directory contains a page table base pointer 245. Table field 225 provides an offset that is combined with page table base pointer 245 to identify the base of the page that contains the physical address 255. Offset field 230 is combined with the page table entry to identify the physical address 255.

FIG. 3 illustrates a shortcoming associated with performing cache look-ups with only a partial main memory address. A processor (not shown) generates linear addresses 304 and 306 in response to load instructions LD0 and LD1. 305 and 307 illustrate the portion of each address that is used to perform a cache look-up. While 305 and 307 appear to be identical, they are only a portion of 304 and 306 respectively. 304 and 306 map to two different physical addresses because each address has a different entry in their respective directory fields (320 and 325) and offset fields (330 and 335). An additional complication is introduced when, as in FIG. 3, a processor supports concurrent execution of multiple threads. Thread 0 and Thread 1 can have different values for the bases of their respective page directories (340 and 345). Thus, even if 304 and 306 were the same, they would map to two different physical addresses.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Use of a context identifier in cache memory is described herein. In the following description, numerous specific details are provided in order to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Cache memory systems index cache lines with a portion of a linear address called a tag. A processor generates the linear address during a memory transfer operation. A portion of the linear address is compared with the tags during a cache look-up. Many Intel® processors provide a mechanism to ensure that an apparent match between a partial address and a tag is a true match. This mechanism is called the hit/miss determinator. The hit/miss determinator operates in parallel with the cache look-up process of cache memory. The hit/miss determinator converts a linear address associated with an issued instruction to the corresponding physical address and compares that physical address with the full address associated with the tag that matches the partial linear address. The hit/miss determinator is much slower than cache memory because it must translate linear addresses into physical addresses and because it performs comparisons of complete addresses. If the hit/miss determinator detects that cache memory has produced a false match, it corrects the mistakes made by cache memory. The process of detecting and responding to errors introduced by a false match in cache memory can degrade processor performance.

Figure 1:
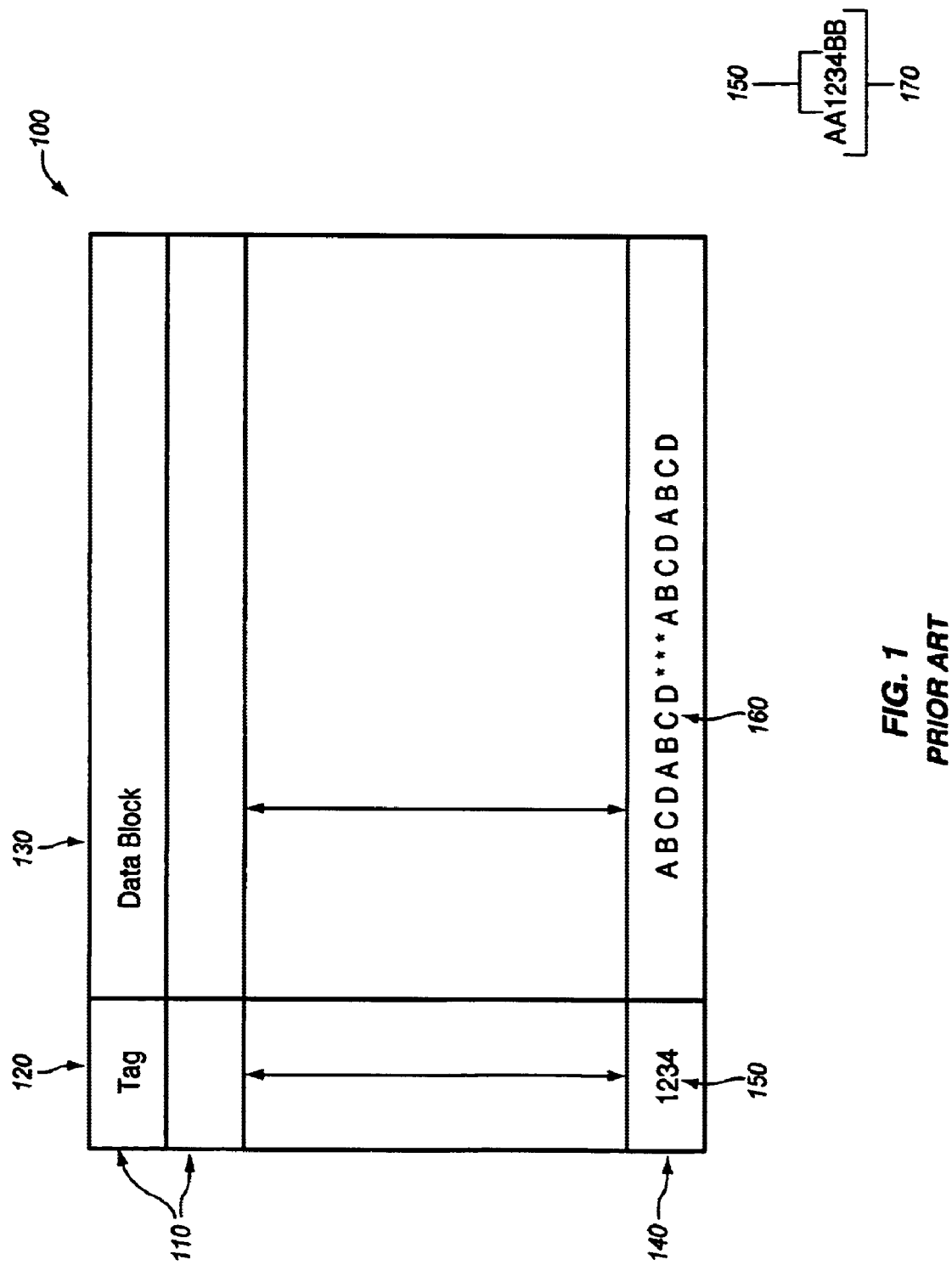
FIG. 1 is a diagram of a prior art cache memory array.
Figure 2:
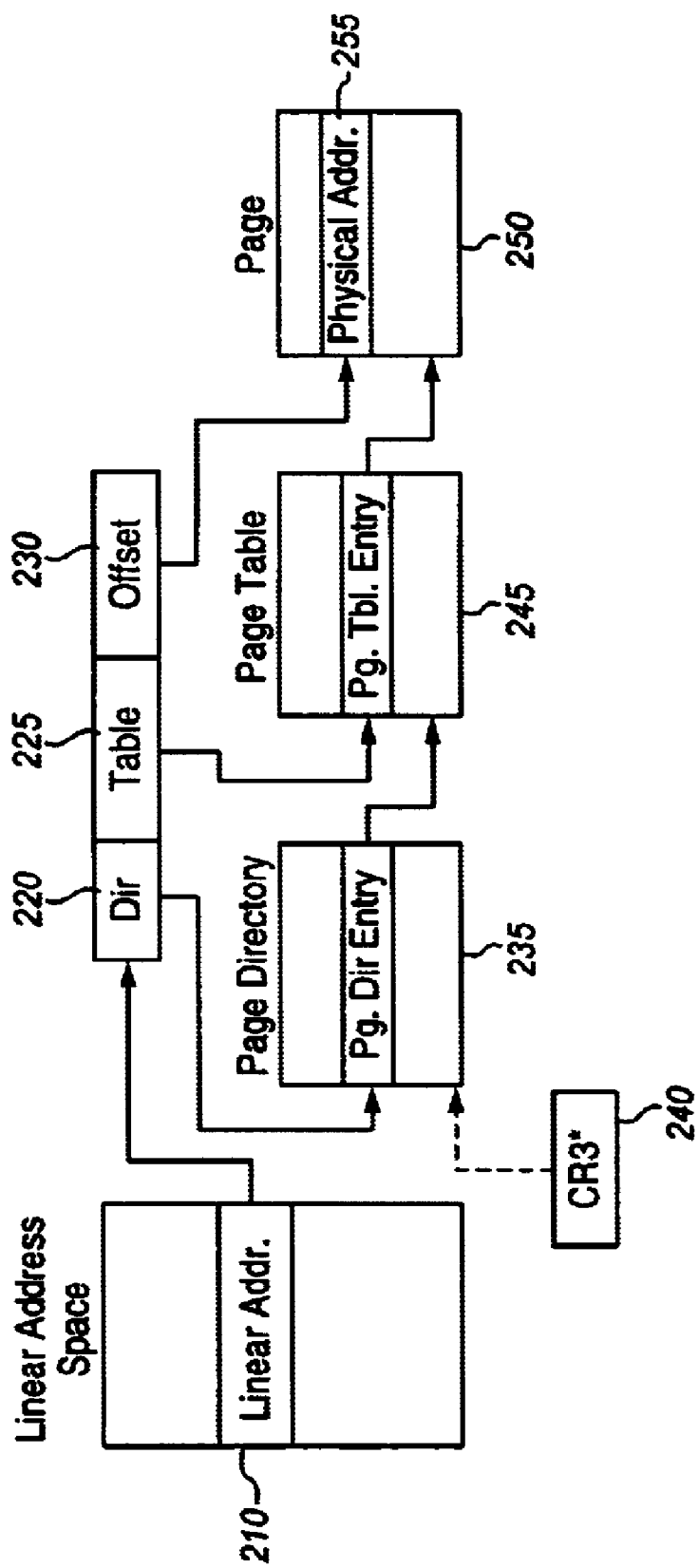
FIG. 2 is a conceptual illustration of mapping a linear address to a physical address.
Figure 3:
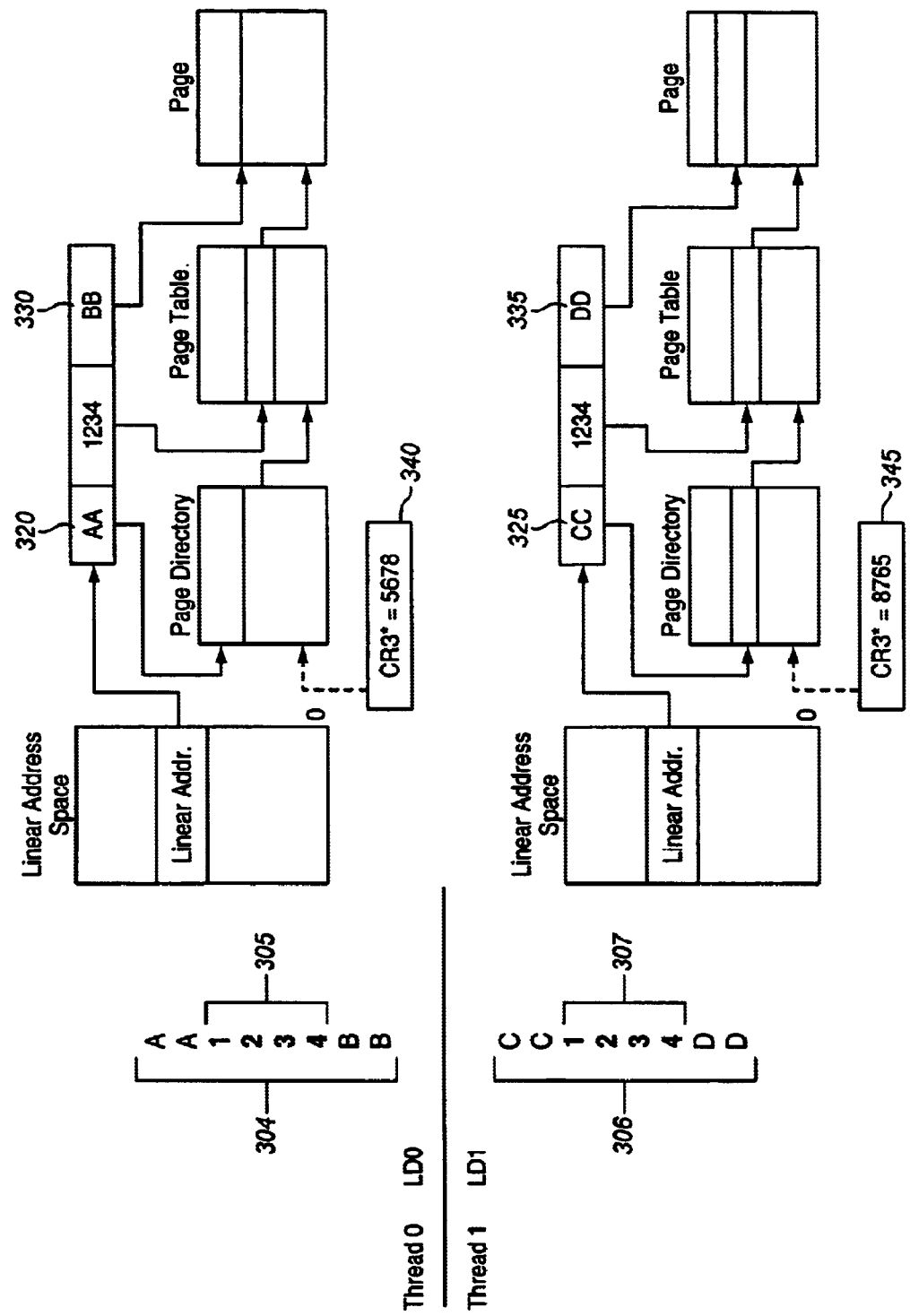
FIG. 3 is a conceptual illustration of two similar tags that map to two different physical addresses.
Figure 4A:
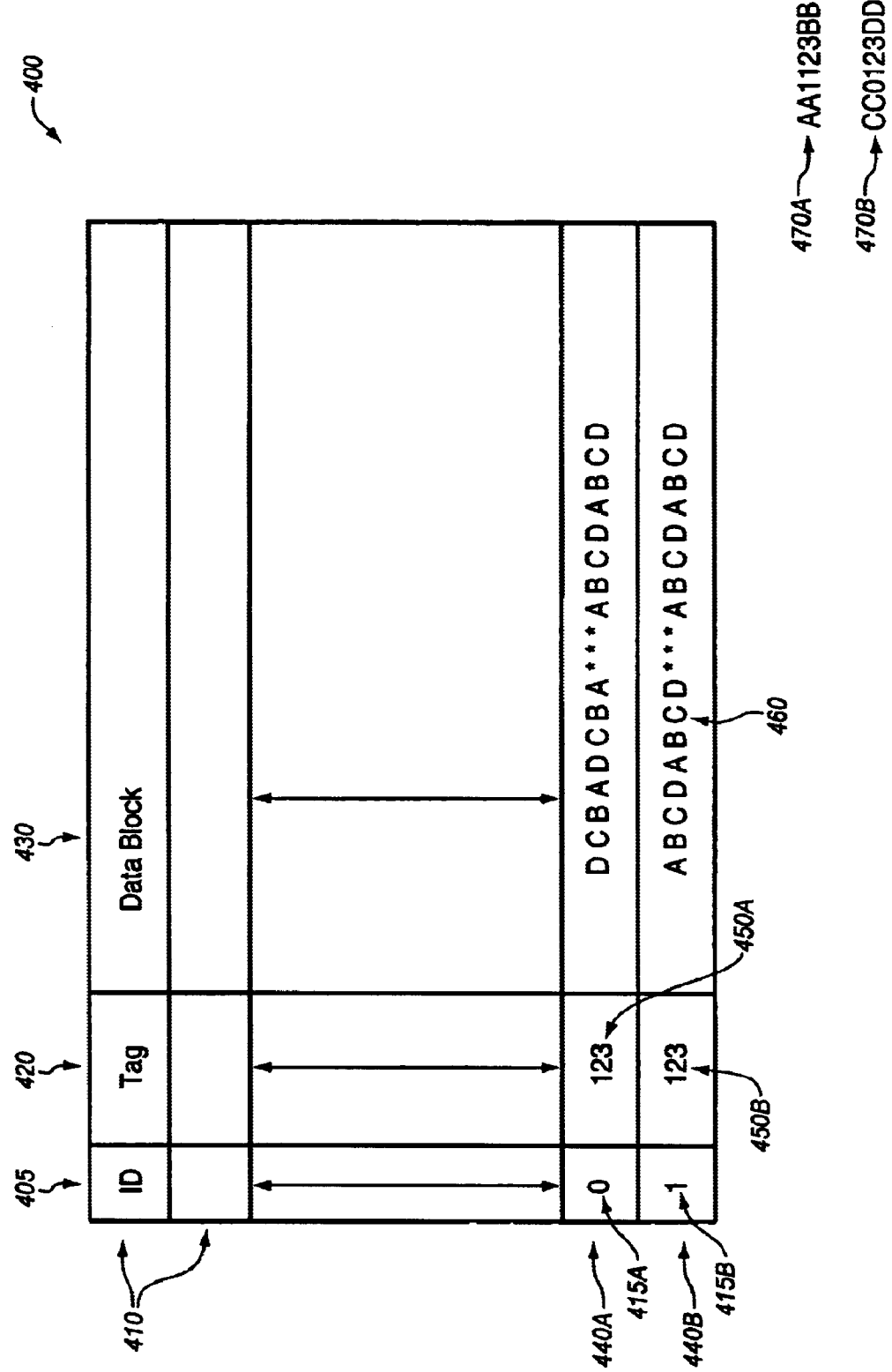
FIG. 4A is a diagram of one embodiment of a cache memory array using a context identifier.

FIG. 4A illustrates one embodiment of a cache memory array incorporating a context identifier. Cache memory array 400 includes a number of cache lines 410. Each cache line 410 includes context identifier 405, tag 420, and data block 430. Thus, cache line 440A includes context identifier 415A and tag 450A. Similarly, cache line 440B includes context identifier 415B and tag 450B. Two different threads generated context identifiers 415A and 415B.

Figure 4B:
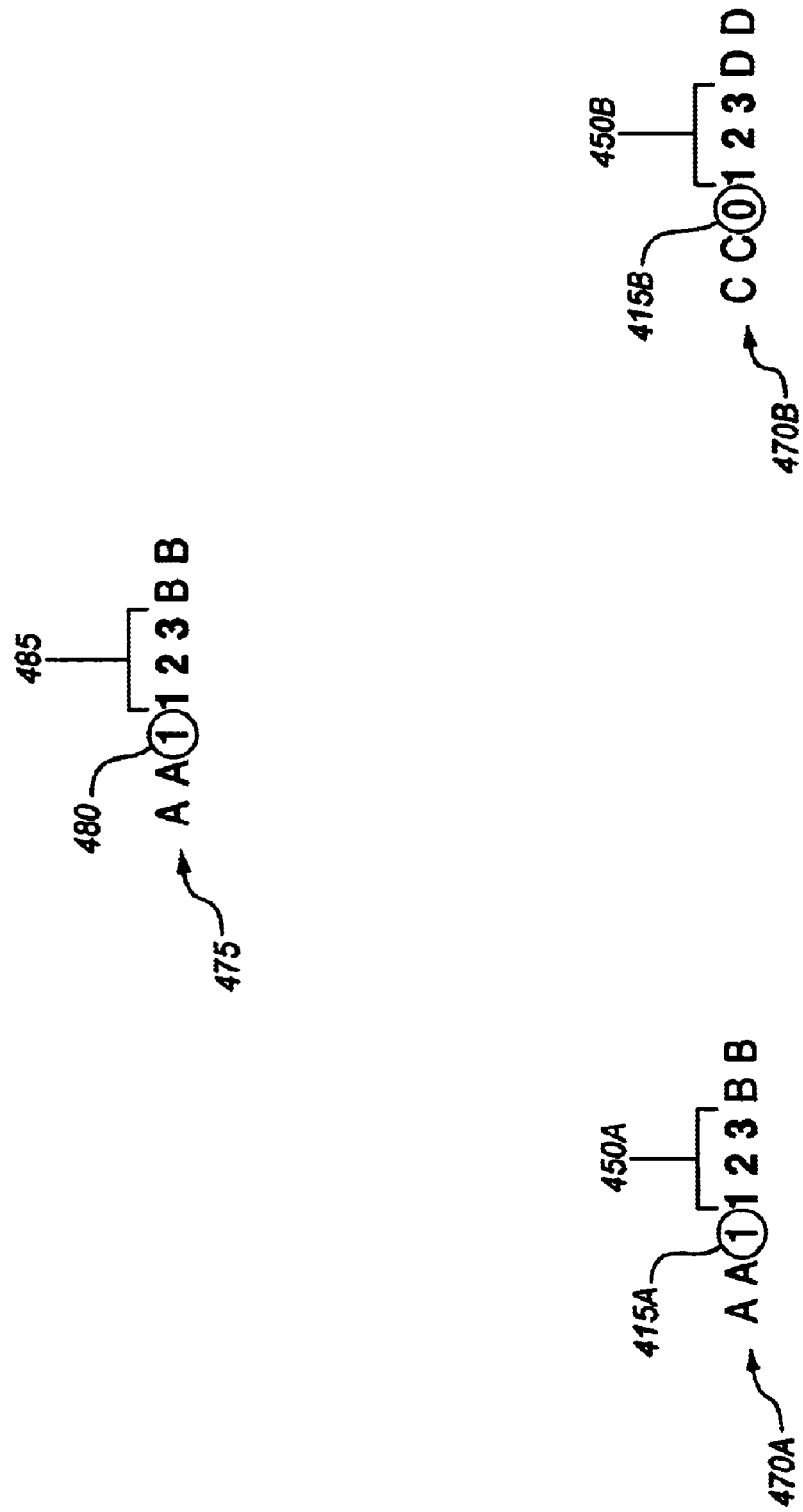
FIG. 4B is a conceptual illustration of one embodiment of a context identifier.

Linear addresses 470A and 470B correspond to tags 450A and 450B. In FIGS. 4A and 4B, linear addresses contain context identifiers to illustrate how context identifiers can be used to distinguish between similar linear addresses. Context identifiers are not part of a linear address, however, and are generated separately from the linear addresses.

Cache memory systems implemented according to the prior art conduct cache look-ups by comparing a partial linear address generated by a processor (not shown) with each tag 420 in cache array 400. If the processor generated a partial linear address of 123, then that address would match both tag 450A and tag 450B. As stated above, a hit/miss determinator ultimately determines which cache line, if either, matches the main memory address generated by the processor. Prior art systems incur a performance penalty when the hit/miss determinator manages and corrects false matches between a partial linear address and a tag 420.

FIG. 4B illustrates the use of context identifiers to reduce the frequency of a false match between a partial linear address generated by the processor and a tag 420. Linear addresses 470A and 470B are associated with cache lines 440A and 440B of FIG. 4A. Address 475 is generated by a processor in response to an issued instruction. Address 475 includes context identifier 480 and partial linear address 485. A prior art cache might have identified a false match between 475 and 470B because partial linear address 485 matches tag 450B. In one embodiment, context identifier 480 is compared with context identifier 415B. Also, in one embodiment partial linear address 485 is compared with tag 450B. Thus, cache array 400 will not find a false match between 475 and 470B because context identifier 480 does not match context identifier 415B.

Figure 5:
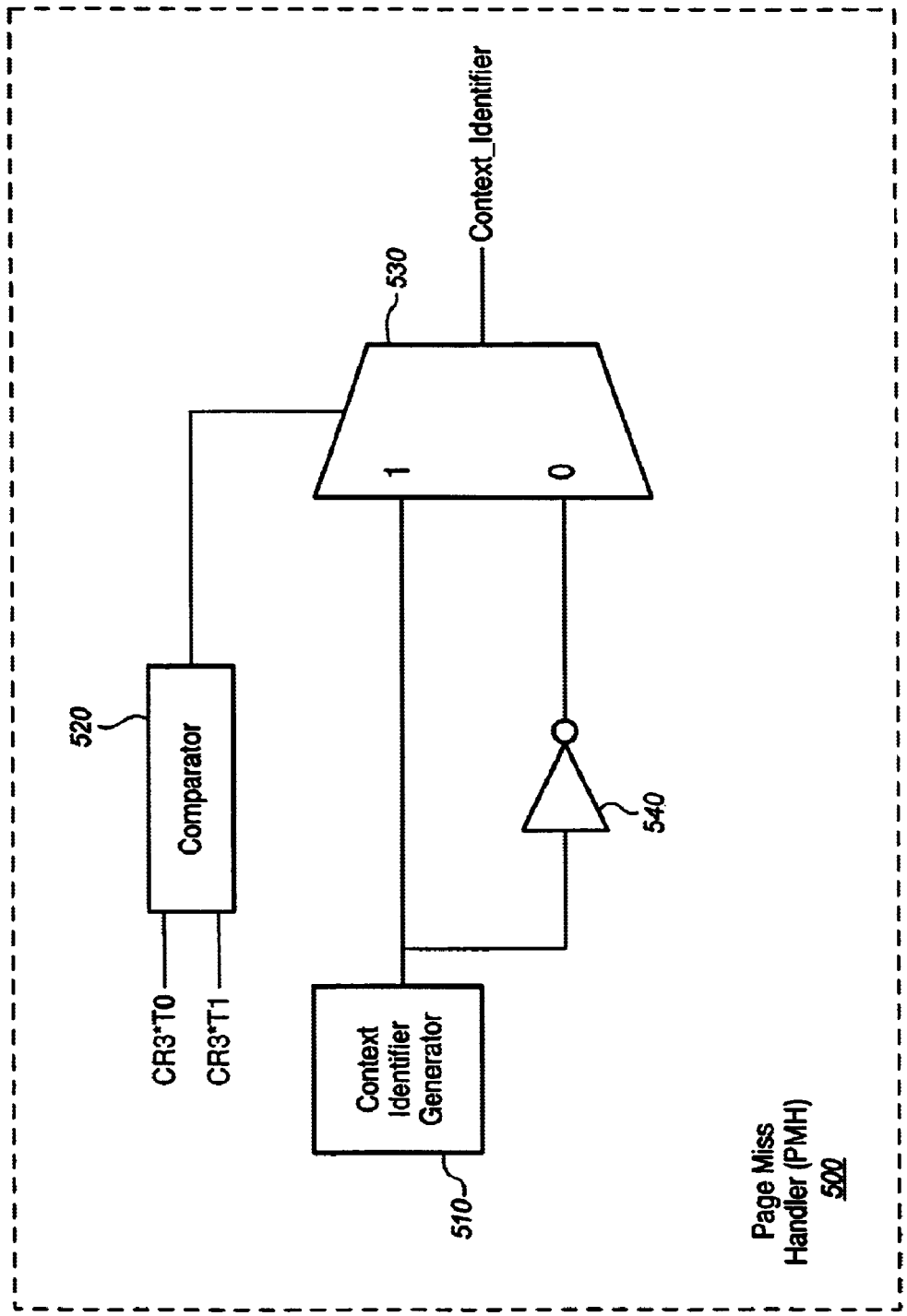
FIG. 5 is a simplified block diagram of one embodiment of a context identifier generator and related control circuitry.

FIG. 5 illustrates one embodiment of a portion of a page miss handler (PMH). In one embodiment, PMH 500 generates and controls the assignment of context identifiers. PMH 500 includes context identifier generator 510, comparator 520, context identifier multiplexer 530, and inverter 540. In one embodiment, context identifier generator 510 generates a one bit binary number corresponding to a currently executing thread. In alternate embodiments of the invention, context identifier generator 510 generates a binary number with more than one bit. Comparator 520 compares the addresses of the bases of the page directories used by two threads that are executing on a processor. In a different embodiment, the context identifier comprises two or more bits.

According to one embodiment, PMH 500 determines whether or not the same context identifier is assigned to the instructions of two different threads. For the embodiment shown in FIG. 5, PMH 500 assigns a first context identifier to a first thread that executes on the processor. For example, if Thread 0 is the first thread to execute on the processor, the processor may assign 0 as Thread 0's context identifier. The context identifier is not required to match the thread number. Thus, Thread 0 may have a context identifier of either 1 or 0. In alternate embodiments of the invention, a processor executes more than two threads of instructions and context identifiers of more than one bit are used.

If a second thread begins to execute on the processor (e.g., Thread 1), PMH 500 determines whether to assign the instructions of the second thread a different context identifier than was assigned to the instructions of Thread 0. It is possible that Thread 0 and Thread 1 are using the same pages in main memory. If so, then it is desirable to assign the same context identifier to the instructions of the two threads because a false match between a tag and a linear address is less likely when the linear address is known to map to the same page as the tag. Comparator 520 determines whether Thread 0 and Thread 1 are using the same pages in main memory by comparing the bases of the page directories used by the two threads.

If Thread 0 and Thread 1 are using the same address as the base for their respective page directories, multiplexer 530 will select the same context identifier for Thread 1 as it selected for Thread 0. Conversely, if comparator 520 indicates that Thread 0 and Thread 1 are not using the same address for the bases of their page directories, multiplexer 530 selects the output of inverter 540 as the context identifier for Thread 1. Determining whether two threads share the same context identifier can be implemented in a different manner. For example, in an embodiment of the invention, the operating system determines whether two threads share the same context identifier and explicitly tells the processor the correct context identifier to associate with a thread. In yet another embodiment of the invention, a predictor that studies the memory access patterns of the threads predicts the context identifier. According to one embodiment, a user may instruct PHM 500 to always select the same value for the instructions of two different threads or to always select a different context identifier value for the instructions of two different threads. Also, some embodiments make use of additional criteria besides the address of the base directory, to determine whether two threads share the same context identifier.

In alternate embodiment of the invention, more than two threads are present in the processor. For an embodiment where n threads are present in the processor, the context identifiers are extended to an encoding scheme that allows for n different context identifiers to be specified. A person of ordinary skill in the art will see that when an n bit context identifier is used, the n bits are placed in the cache in the same way that a single bit is placed in the cache. Also, a person of ordinary skill in the art will see that comparing n bit context identifiers to each other can be done in nearly the same way as comparing two single bit context identifiers.

An embodiment of the invention with multiple threads uses a pool of unused context identifiers. When a thread changes its page table base (CR3), it compares the new value to the value of the page table base used by other active threads or any valid page table base of a context identifier in the pool. If there is a match, it takes the value of the context identifier of the thread that produced the match. If there is not a match with another active thread, it takes an unused context identifier from the pool. Context identifiers are returned to the unused pool when either a thread changes its page base value, or the last line of cache with a given context identifier is deallocated. The latter arrangement allows a thread to hit on data that a previous thread brought in. A person of ordinary skill in the art will see that many schemes for predicting the value of a context identifier for a thread can be used.

Figure 6:
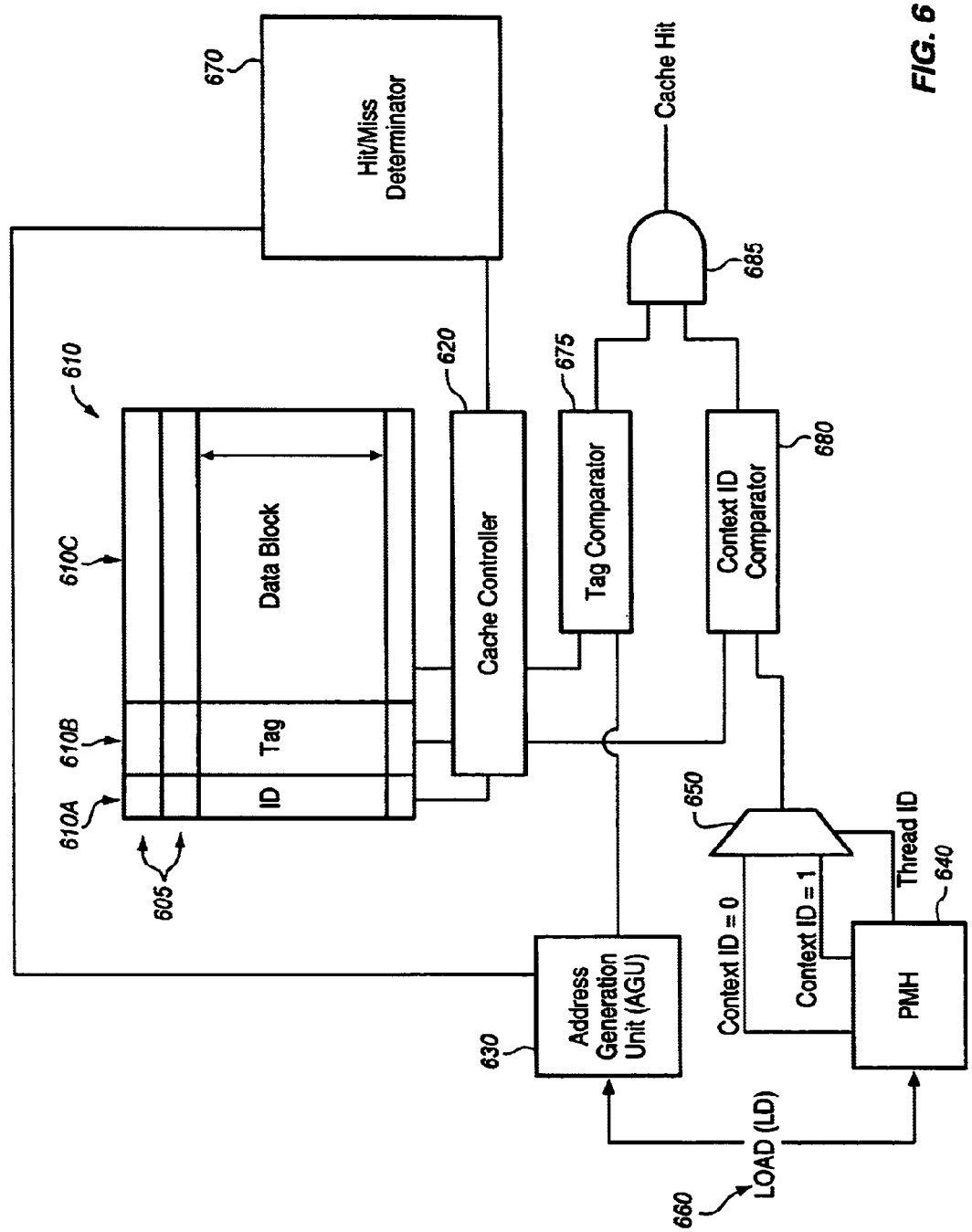
FIG. 6 is a block diagram of one embodiment of a cache memory system.

FIG. 6 illustrates a read from a cache memory system having a context identifier. Cache array 610 includes cache lines 605. Each cache line 605 includes a context identifier 610A, a tag 610B, and a data block 610C. Cache array 610 is coupled to cache controller 620. Cache controller 620 controls access to the data contained in cache array 610.

Cache controller 620 is coupled to hit/miss determinator 670 and comparators 675 and 680. The operation of hit/miss determinator 670 and comparators 675 and 680 is discussed below. In one embodiment, comparator 675 is coupled to AGU 630 as well as AND gate 685. AGU 630 generates linear addresses for issued instructions that require a memory transfer (e.g., LOAD and STORE instructions). In one embodiment, comparator 680 is coupled to AND gate 685 and PMH 640 through multiplexer 650. PMH 640 contains control logic used to determine which context identifier is assigned to which issued instruction.

A read cycle is typically initiated by an issued LOAD instruction (LD) 660. LD 660 is sent to PMH 640 and AGU 630. PMH 640 determines, among other things, which thread is the source of LD 660. PMH 640 assigns a context identifier to LD 660 based, in part, on which thread is the source of LD 660. PMH 640 issues a context identifier associated with LD 660 to comparator 680 through multiplexer 650. Similarly, AGU 630 issues a partial linear address to comparator 675.

Comparators 675 and 680 use the partial linear address and LD 660's context identifier to determine whether cache array 610 contains the information that LD 660 requires. If cache array 610 contains the required information a cache hit results. If cache array 610 does not contain the required information a cache miss results.

A cache hit requires that a particular cache line contain a context identifier that matches LD 660's context identifier and a tag that matches the partial linear address corresponding to LD 660. Comparators 675 and 680 compare the tag field and the context identifier field of each cache line with LD 660's context identifier and partial linear address. According to one embodiment, there are as many comparators as there are cache lines so that comparisons can be done in a single parallel operation. If a single cache line contains a context identifier and a tag that matches LD 660's context identifier and partial linear address, then AND gate 685 signals a cache hit. The possibility exists, however, that the cache hit is based on a false match because comparator 675 compares only a portion of LD 660's address with each tag in cache array 610A.

Hit/miss determinator 670 detects whether a cache hit is based on a false match. Hit/miss determinator receives the full linear address of the location in main memory from which LD 660 requires an instruction/operand. According to one embodiment, hit/miss determinator 670 translates the linear address conveyed to it by the AGU to a physical address. Hit/miss determinator 670 determines the physical address corresponding to the tag matching LD 660's partial linear address. Hit/miss determinator 670 compares both complete physical addresses to determine whether the cache hit is based on a false match.

Figure 7:
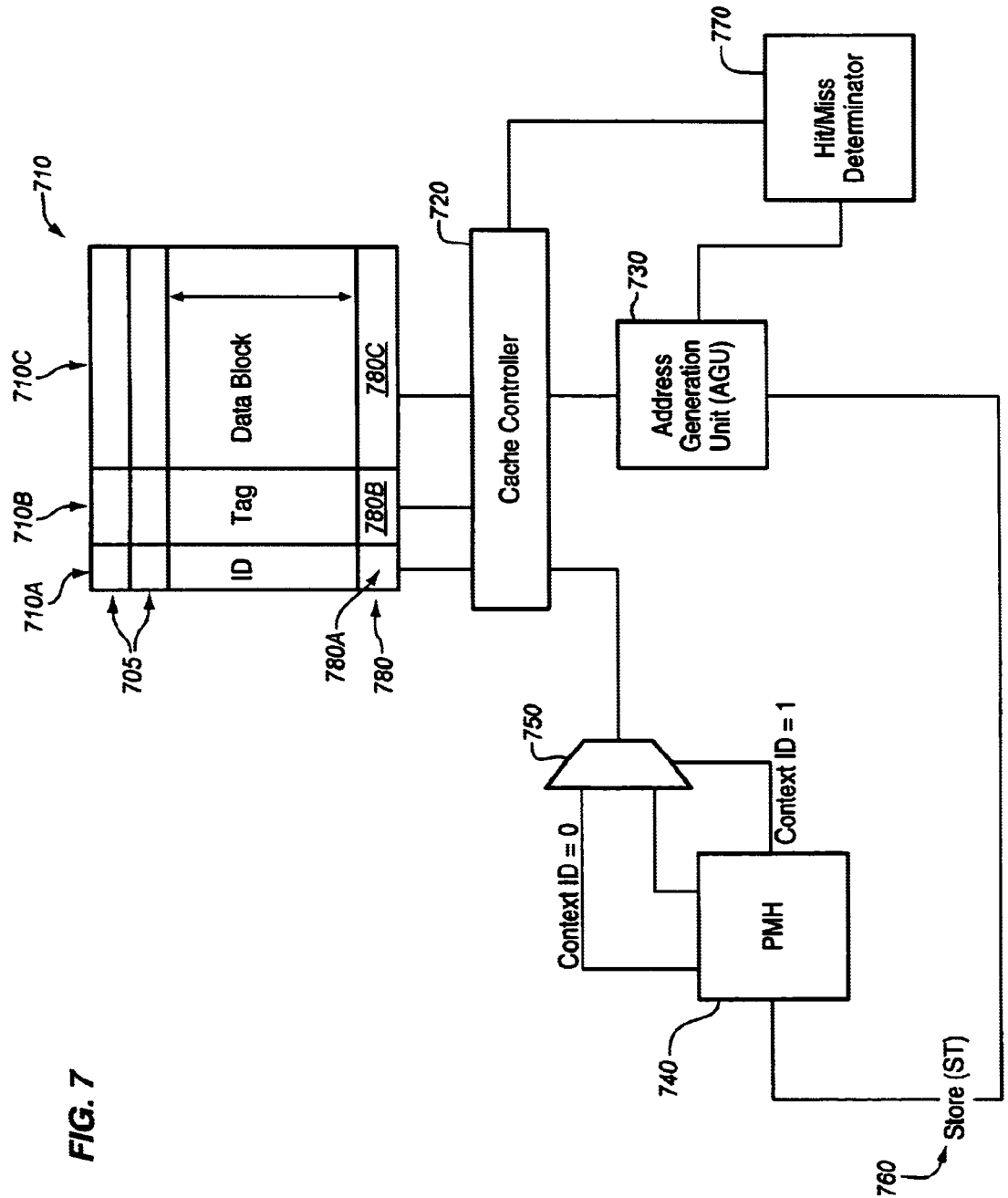
FIG. 7 is a block diagram of one embodiment of a cache memory system.

FIG. 7 illustrates a write to cache memory using a context identifier. Cache array 710 includes a number of cache lines 705. Each cache line 705 includes a context identifier 710A, a tag 710B, and a data block 710C. Cache array 710 is coupled to cache controller 720. Cache controller 720 performs a number of functions including determining into which cache line a block of data will be written. Cache controller 720 is coupled to AGU 730 and PMH 740 through mulitplexer 750.

Issued instruction 760 is sent from the processor (not shown) to PMH 740 and AGU 730. In one embodiment, AGU 730 generates a linear address when issued instruction 760 requires a memory transfer. AGU 730 is generally part of the processor's execution core. In other embodiments AGU 730 may generate a physical address. In one embodiment, PMH 740 generates at least two context identifiers and the control signals that control multiplexer 750. In other embodiments, PMH 740 may generate any number of context identifiers.

A write cycle is typically initiated by an issued store instruction (ST) (e.g., ST 760). ST 760 is sent to PMH 740 and AGU 730. PMH 740 determines which thread is the source of ST 760. PMH 740 further determines which context identifier to assign to ST 760. According to one embodiment, PMH 740 has three modes of operation: OFF, NON-SHARED, and ADAPTIVE. If PMH 740 is operating in the OFF mode, then PHM 740 may write the same value for each context identifier. A cache line is shared by the instructions of two or more threads if the threads have the same context identifier as the context identifier stored in the cache line.

When operating in the NON-SHARED mode, PMH 740 may assign a context identifier that is particular to the thread that contains the issued instruction. In one embodiment, the ADAPTIVE mode allows PMH 740 to dynamically determine whether to assign the same or different context identifiers for instructions originating from different threads. In one embodiment, if the threads share the same address for the base of their page directories, then PMH 740 dynamically assigns the same context identifier for the instructions contained in the threads. If not, in an embodiment, then PMH 740 dynamically assigns different context identifiers to the instructions contained in the threads.

In one embodiment, PMH 740 considers whether the computer is in multi-threaded mode and whether paging is enabled when determining whether to write the same context identifier for the instructions of two different threads. Any number of criteria may be used to determine the value of a context identifier that is assigned to an issued instruction. Further, the context identifier generator and related control logic can be located in a number of places within an electronic system and need not be contained in the PMH or similar unit.

PMH 740 sends a context identifier appropriate for ST 760 to cache controller 720, through multiplexer 750. AGU 730 generates a linear address corresponding to the main memory location to which ST 760A seeks to store data. AGU 730 provides cache controller 720 and hit/miss determinator 770 with the linear address corresponding to ST 760. Cache controller 720 applies a cache line replacement policy to determine which cache line will be used to store data for ST 760. Cache line replacement policies are well known in the art (see e.g., Handy, Jim; *The Cache Memory Book;* Academic Press, 1998 for a more detailed description of cache line replacement policies).

After selecting an appropriate cache line, cache controller 720 writes the context identifier to the context identifier field 780A of the selected cache line 780. Cache controller 720 writes a portion of ST 760's linear address to the tag field 780B of cache line 780. In one embodiment, the tag comprises bits 23 to 12 of a 32 bit linear address. There are many combinations of address bits that may be used for the tag. The cache controller writes the data associated with ST 760 into data block field 780C of selected cache line 780. Cache management can be controlled by instructions from an electronically accessible medium, which may be used to program a computer (or other electronic devices) to perform a process described herein. The electronically accessible medium may include, but is not limited to, floppy diskettes, optical disks, CD-ROMs, magneto-optical disks, ROMs, RAMs, EPROMs, EEPRPOMs, magnet or optical cards, flash memory, or other type of media/machine-readable medium suitable for storing electronic instructions. Moreover, the instructions may also be downloaded as a computer program product, wherein the program may be transferred from a remote computer to a requesting computer by way of data signals embodied in a carrier wave or other propagation medium via a communications link (e.g., a modem or a network connection).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   comparing an address of a base of a page directory used by a first thread with an address of a base of a page directory used by a second thread, to determine if the address of the base of the page directory used by the first thread matches the address of the base of the page directory used by the second thread;
   assigning a context identifier to both the first thread and the second thread if the address of the base of the page directory used by the first thread matches the address of the base of the page directory used by the second thread; and
   assigning a different context identifier to the first thread and the second thread if the address of the base of the page directory used by the first thread does not match the address of the base of the page directory used by the second thread.

2. The method of claim 1 further comprising:
   storing the address of the base of the page directory of the first thread in a first register;
   storing the address of the base of the page directory of the second thread in a second register;
   reading the first register to determine the address of the base of a page directory of the first thread; and
   reading the second register to determine the address of the base of the page directory of the second thread.

3. The method of claim 2 wherein the first register and the second register are the same register.

4. The method of claim 1 wherein the same context identifier is assigned to the first thread and the second thread.

5. The method of claim 1 wherein a different context identifier is assigned to the first thread and the second thread.

6. An apparatus comprising:
   an address generating unit (AGU) to generate addresses in response to an instruction issued by a processor;
   a cache to store a plurality of cache lines, each of the plurality of cache lines including at least a context identifier, a tag, and a data block, the context identifier to identify one of a plurality of concurrently executing threads;
   at least one comparator coupled to the AGU and coupled to the cache to compare an address portion generated by the AGU with each of the tags in each of the plurality of cache lines;
   a control unit to generate two or more context identifiers and to select one of the two or more context identifiers;
   at least one comparator coupled to the control unit and coupled to the cache to compare the context identifier selected by the control unit with each of the context identifiers in each of the plurality of the cache lines,
   a first register to store an address of a base of a page directory associated with a first thread of executing computer instructions;
   a second register to store an address of a base of a page directory associated with a second thread of executing computer instructions;
   an other comparator coupled to the first register and the second register to compare the value stored in the first register with the value stored in the second register;
   a context identifier generator to generate at least two context identifiers; and
   a multiplexer coupled to the context identifier generator and the comparator to select one of the at least two context identifiers.

7. The control unit of claim 6 wherein:
   the multiplexer is to select a first context identifier if the address of the base of the page directory associated with the first thread of executing computer instructions matches the address of the base of the page directory associated with the second thread of executing computer instructions; and
   the multiplexer is to select a second context identifier if the address of the base of the page directory associated with the first thread of executing computer instructions does not match the address of the base of the page directory associated with the second thread of executing computer instructions.

8. An article comprising a machine readable medium storing information representing a processor, the processor comprising:
   a cache memory to store a plurality of cache lines, each cache line having an associated tag and an associated context identifier, the context identifier to identify one of a plurality of concurrently executing threads; and
   comparison logic to compare a request tag and a request context identifier to said associated tag and said associated context identifier for each one of said plurality of cache lines, wherein in a first mode, said associated context identifier comprises a thread identifier, and wherein in a second mode, said associated context identifier is a predicted context identifier.

9. The article comprising a machine readable medium storing information representing a processor of claim 8 wherein in said second mode, said predicted context identifier is determined, at least in part, by comparing a base of a page directory used by a first thread with a base of a page directory used by a second thread, to determine if the base of the page directory used by the first thread matches the base of the page directory used by the second thread.

10. The article comprising a machine readable medium storing information representing a processor of claim 8, wherein said comparison logic is to generate a hit signal only if a context identifier match and a tag match occurs.

* * * * *